(12) United States Patent
Bleijenberg et al.

(10) Patent No.: US 7,456,227 B2
(45) Date of Patent: Nov. 25, 2008

(54) POLYMER PARTICLES AND RELATED ARTICLES

(75) Inventors: Karel Cornelis Bleijenberg, Hilversum (NL); Michel F. J. Berghmans, Calgary (CA); Hugo A. A. Berghmans, Leuven (BE)

(73) Assignee: NOVA Chemicals Inc., Moon Township, PA (US)

( * ) Notice: Subject to any disclaimer, the term of this patent is extended or adjusted under 35 U.S.C. 154(b) by 0 days.

(21) Appl. No.: 11/841,154

(22) Filed: Aug. 20, 2007

(65) Prior Publication Data

US 2008/0064772 A1  Mar. 13, 2008

Related U.S. Application Data

(60) Provisional application No. 60/843,234, filed on Sep. 8, 2006.

(51) Int. Cl.
*C08J 9/18* (2006.01)

(52) U.S. Cl. .............................. 521/56; 521/58; 521/60; 521/146

(58) Field of Classification Search .................. 521/56, 521/58, 60, 146; 524/444, 493
See application file for complete search history.

(56) References Cited

U.S. PATENT DOCUMENTS

| 2,797,443 | A | * | 7/1957 | Carlson, Jr. ................... 521/79 |
| 5,096,931 | A | | 3/1992 | Wittenberg et al. |
| 6,127,439 | A | | 10/2000 | Berghmans et al. |
| 6,160,027 | A | | 12/2000 | Crevecoeur et al. |
| 6,166,099 | A | | 12/2000 | Krupinski |
| 6,242,540 | B1 | | 6/2001 | Crevecoeur et al. |
| 6,274,641 | B1 | | 8/2001 | Krupinski |
| 6,342,540 | B1 | | 1/2002 | Gluck et al. |
| 6,387,968 | B1 | | 5/2002 | Gluck et al. |
| 6,398,997 | B1 | * | 6/2002 | Ligon et al. ................... 264/53 |
| 6,420,444 | B1 | | 7/2002 | Krupinski |
| 6,433,092 | B2 | | 8/2002 | Krupinski et al. |
| 6,476,149 | B1 | | 11/2002 | Krupinski |
| 6,528,570 | B1 | | 3/2003 | Berghmans et al. |
| 6,608,141 | B2 | | 8/2003 | Krupinski et al. |

FOREIGN PATENT DOCUMENTS

| GB | 1106143 | | 3/1968 |
| JP | 59-109532 | * | 6/1984 |
| JP | 6-262071 | * | 9/1993 |

* cited by examiner

*Primary Examiner*—Irina S Zemel
(74) *Attorney, Agent, or Firm*—Gary F. Matz; Suzanne Kikel

(57) ABSTRACT

Process for preparing polymer, e.g. polystyrene, particles that may not or may contain a water-retaining agent and that require only a one-step process for incorporating the water-retaining agent. The polymer particles may be prepared via an extrusion process, or a bulk polymerization process wherein a water-retaining agent is blended into the polymer melt. Water is incorporated into the particles by soaking them in hot or cold water or treating the particles with steam for a predetermined time depending on the desired water content in the particles. The water-retaining agent may be starch, zeolite, silica dioxide or poly (N-isopropyl acrylamide) ranging from 0.1% to 10.0% by weight. The particles can be expanded via appropriate means to form pre-expanded or expanded particles in a conventional manner.

10 Claims, 4 Drawing Sheets

POLYMER PARTICLES AND RELATED ARTICLES

This application claims the benefit of priority of U.S. Provisional Application Ser. No. 60/843,234 filed Sep. 8, 2006 entitled "Polymer Particles and Related Articles" which is herein incorporated by reference in its entirety.

BACKGROUND OF THE INVENTION

1. Field of the invention

The invention relates to polymer particles, e.g. solid (SPS) or expandable polystyrene (EPS) particles. More particularly, the invention relates to a process for preparing polymer particles that optionally contain a water-retaining agent, to polymer particles per se, to a method for incorporating water into the polymer particles after the particles are formed and/or after the particles are formed into an article, e.g. boards, panels, and sheets, and to foamed articles made from the polymer particles.

2. Background Art

Particles that contain a polymer of a vinylarene monomer and a blowing agent are generally known as expandable polymer particles. A well-known type of expandable polymer particle is expandable polystyrene. Expandable polystyrene may be produced on a commercial scale by suspension polymerization. The blowing agent is generally a low-boiling hydrocarbon, such as a $C_3$-$C_8$ hydrocarbon, in particular pentane isomers. The expandable polystyrene is used for making foamed articles that are produced by expanding the polystyrene particles. In the expansion process, the hydrocarbon blowing agent is released and may be emitted into the environment. Such emissions are regarded as being undesirable and ways are sought to avoid such emissions. One way is to recover or burn the emitted hydrocarbon. Another way is to reduce the amount of hydrocarbon blowing agent in the expandable polymer particles.

In U.S. Pat. No. 5,096,931, expandable polystyrene particles are described which contain polystyrene, a small amount of a polar polymer that acts as a water retaining agent, water, and a reduced amount of hydrocarbon blowing agent. Although the amount of hydrocarbon foaming agent has been reduced, such foaming or blowing agent must still be present in order to achieve satisfactory expansion of the particles.

GB-A-1106143 discloses a process for preparing water expandable polystyrene particles by mixing via vigorous mechanical agitation, styrene monomer, water, and an emulsifier with a free-radical initiator to obtain an emulsion containing small droplets of water. Subsequently, the emulsion is suspended in an aqueous phase and the resulting suspension is subjected to polymerization. In order to achieve a satisfactory expansion certain amounts of organic blowing agents are included.

Other processes for preparing water expandable styrene polymers (WEPS) are disclosed in U.S. Pat. Nos. 6,160,027; 6,127,439; 6,242,540, and 6,528,570. The process of U.S. Pat. No. 6,160,027 partially polymerizes a mass of styrene incorporated with water together with an emulsifier, and then polymerizes the partially polymerized mass to a high conversion using conventional suspension techniques.

The process of U.S. Pat. No. 6,127,439 produces expandable polymer of a vinyl aromatic monomer and a polar water absorbing monomer. The monomers are partially polymerized and then suspended in water so that the resulting beads contain 3 to 40 weight percent water that acts as the sole or predominant blowing agent.

U.S. Pat. No. 6,242,540 discloses particles of a copolymer of a vinylarene and a copolymerizable compound containing a polar moiety and a vinyl moiety containing water. The particles are prepared by forming a mixture of monomers and small amounts of water. This mass is polymerized under agitation to 20% to 70% conversion and then suspended in water for completing the polymerization. The resulting polymer beads contain finely dispersed water and are useful as an environmentally acceptable blowing agent.

U.S. Pat. No. 6,528,570 discloses polymer particles containing a polymer of a vinylarene monomer, a porous silicate compound, and 1.5% by weight of water, based on the weight of vinylarene, water and porous silicate compound. The porous silicate compound is selected from alumino silicates and amorphous silica particles.

A further example of a process for preparing expandable styrene polymers, which comprise water as the sole blowing agent is disclosed in U.S. Pat. No. 6,387,968. In this process, the styrene is polymerized in aqueous suspension in the presence of 0.1 to 15% by weight of a solid substance, for example, carbon black or graphite insoluble in water and in styrene.

In general, a disadvantage of the above processes for preparing water expandable styrene polymers is that the process is carried out in two stages, the first stage being a pre-polymerization stage where the emulsifiers or water retaining agents are first emulsified or blended into the styrene/polystyrene or polymer mixture, and the second stage being suspension polymerization where the mixture is polymerized in suspension.

U.S. Pat. No. 6,342,540 (BASF) discloses a simpler, single-stage process for preparing WEPS. This is achieved by mixing a melt of a styrene polymer with from 3 to 20% by weight of water and with an emulsifying agent under super atmospheric pressure, extruding the melt into a cooling medium maintained under super atmospheric pressure, and pelletizing the extrudate after cooling. In this instance, the water is incorporated into the polymer in the extrusion process at the same time as the emulsifying agent.

Solid polymer particles are also well known to those skilled in the art. Such particles generally are those that do not contain a blowing agent when the particles are produced. However, a blowing agent may be incorporated into the polymer during further processing, such as through an extrusion process for forming foamed boards. Examples of solid polymer particles, e.g. polystyrene particles, include those taught in U.S. Pat. Nos. 6,166,099; 6,274,641; 6,420,444; 6,476,149; 6,433,092 and 6,608,141. These polymer particles are formed into foamed boards or uni-axially or bi-axially oriented sheets.

There is still a need in the art to provide a process for preparing water expandable polystyrene (WEPS) particles in a simpler, single-stage process.

There is also a need in the art to provide expandable polymer particles that do not have water added and/or contained in the polymer until the polymer is ready for expansion, which may involve preparing articles, such as panels or sheets from these polymer particles in various conventional processing lines and operations.

SUMMARY OF THE INVENTION

The invention has met these needs. The invention provides a process for preparing polymer particles, the steps comprising:

optionally blending a water retaining agent into a polymer melt, forming said polymer melt into particles, and after said particles are formed, incorporating water into said polymer particles that is retained in said polymer to form expandable polymer particles, and said water acting as a sole blowing agent for expanding said expandable polymer particles.

The invention further provides a foamed panel produced via conventional processes including an extrusion process, and made from either solid, i.e. non-expandable particles or from expandable polymer particles, i.e. particles that contain a blowing agent. The foamed panel, if formed in an extrusion process, can be made in a conventional manner by permitting the polymer, e.g. polystyrene to expand at the extruder die head into a foamed board or panel.

The invention further provides a process for producing an extruded foamed article, the steps comprising:

introducing the polymer particles described herein above into an extruder to form an extruded article, and soaking said extruded article in water at a temperature no greater than about 100° C. for a predetermined time to expand said particles to form said extruded foamed article.

The invention further provides a process for producing an extruded foamed article, the steps comprising:

introducing the polymer particles described herein above into an extruder to form an extruded article, and applying steam at a temperature of at least 100° C. to said extruded article for a predetermined time to expand said particles to form said extruded foamed article.

The invention further provides polymer particles optionally containing from about 0.1% by weight to about 10.0%, preferably up to about 5% by weight of a water retaining agent based on the weight of the polymer, and extruded foamed articles, e.g. panels, boards, and sheets, made from these polymer particles. The polymer particles or the formed articles made from the polymer particles can be either soaked in water or treated with steam so that the particles or articles expand from a non-expanded resin to a lower density compared to the non-expanded density of the particles or articles formed from the particles.

It is a further object of the present invention to provide polymer particles and/or articles formed from the polymer particles in which water, which serves as a blowing agent in an expansion process, can be incorporated into the particles or articles and dispersed throughout the polymer melt in a controllable manner.

It is a further object of the present invention to provide polymer particles and/or articles made from the polymer particles in which water, which serves as the blowing agent in an expansion process, and the water-retaining agent, if blended into the polymer melt, are distributed homogenously within the polymer melt and the size of the water droplets within the polymer melt ranges from about 10 μm to about 500 μm, so as to produce a satisfactorily final morphology for the expanded particles.

It is still a further object of the present invention to optionally incorporate a water retaining agent into the polymer particles wherein the water retaining agent is selected from the group consisting of poly(N-isopropyl acrylamide), starches, zeolites, and silica dioxide.

A still further object of the present invention is to produce polymer particles via conventional processes, e.g. an extrusion process wherein the particles may contain a water-retaining agent and the shape, size, and size distribution of the particles, as well as the distribution of the water-retaining agent in the particles, are controlled by the extrusion process.

A still further object of the present invention is to produce polymer particles via a bulk polymerization process wherein the particles may contain a water-retaining agent and the shape, size, and size distribution of the particles, as well as the distribution of the water-retaining agent in the particles, are controlled via the bulk polymerization process.

These and other objects of the invention will be better appreciated and understood when the following description is read along with the accompanying drawings and claims.

DETAILED DESCRIPTION OF THE INVENTION

Figure 1:
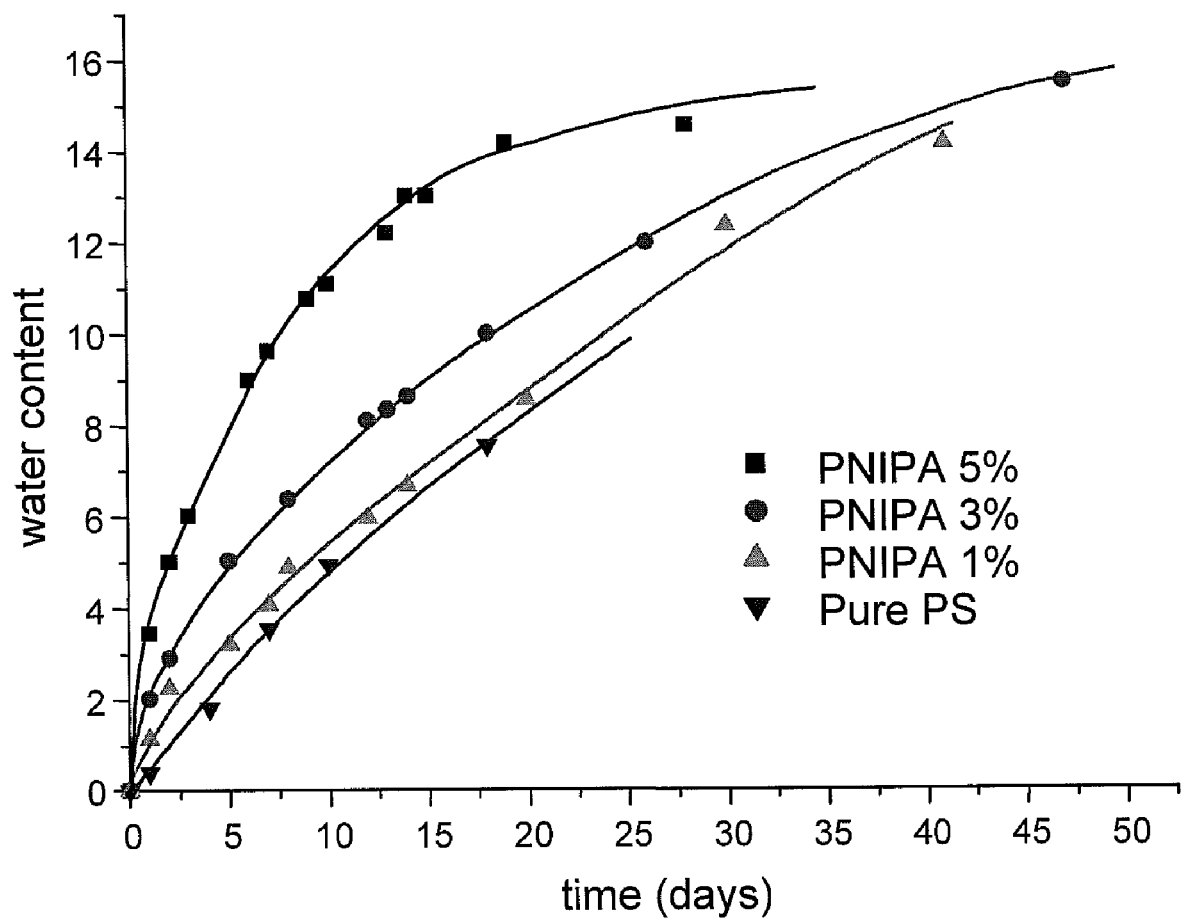
FIG. 1 is a graph illustrating pure polystyrene particles that do not contain a water retaining agent and polystyrene particles that contain poly(N-isopropyl acrylamide)(PNIPA)as a water retaining agent, and the water content in the polystyrene particles as a function of time.
Figures 2A, 2B, 2C, 2D, 2E, 2F, 2G, 2H:
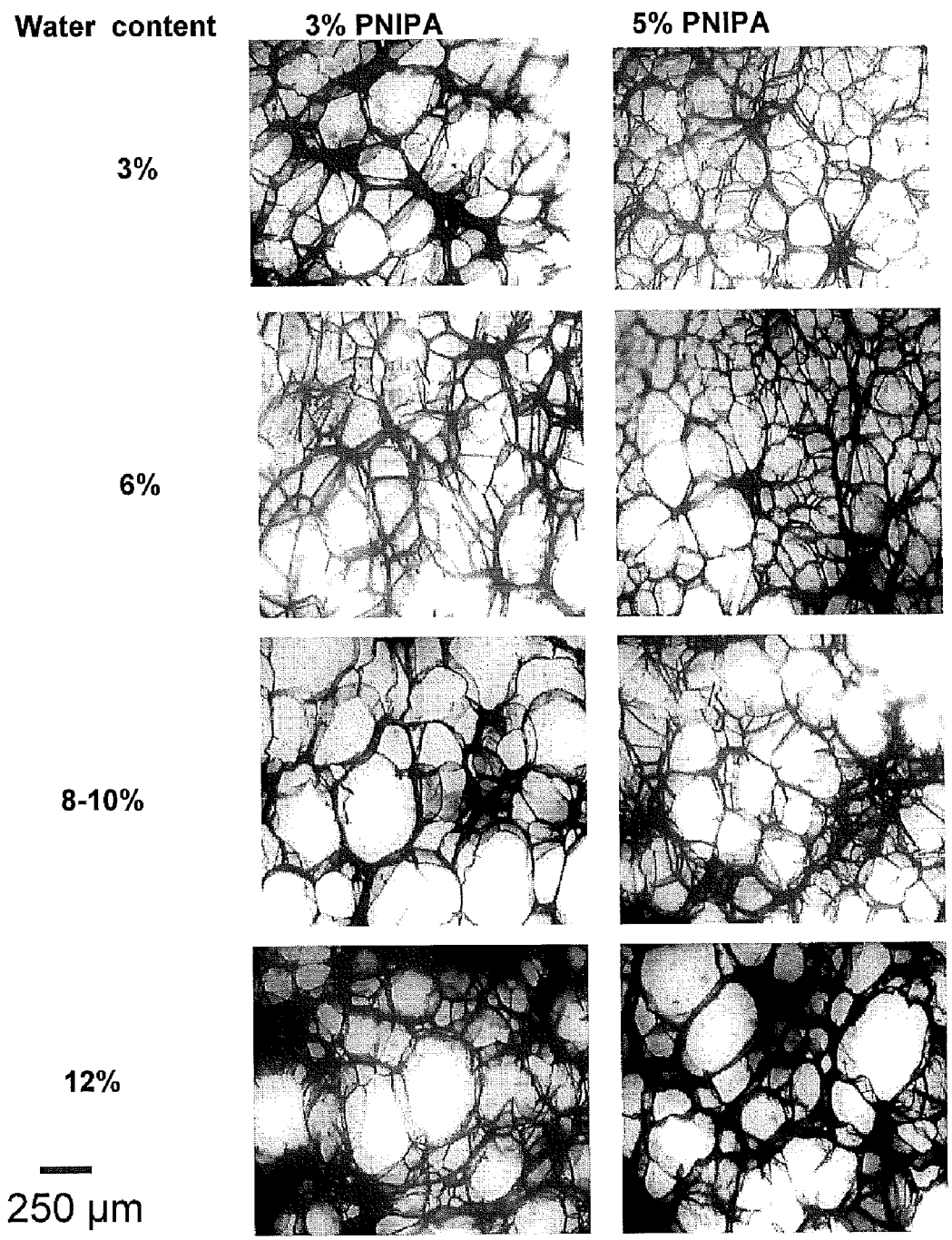
FIGS. 2A-2H are a series of optical micrographs illustrating the foam morphology of polystyrene particles containing 3% and 5% by weight PNIPA as a water retaining agent and as having a water content of 3%, 6%, 8-10% and 12% by weight based on the water of the polymer.

The invention involves a method for producing polymer particles, for example solid particles or water expandable polystyrene (WEPS) particles, by first making the particles and then adding water to these particles, preferably just prior to expansion of these particles. The invention also involves a method for producing non-foamed or foamed articles, e.g. boards, sheets, and panels, by first making the articles from the polymer particles and then adding water to these articles, preferably just prior to expansion of the particles in these articles.

The addition of water to the particles themselves or to the articles made from the polymer particles may include soaking the particles or articles for a predetermined time in either hot or cold water or applying steam to the particles or articles. These polymer particles per se or particles forming the articles may or may not contain a water-retaining agent. In general, these particles may be prepared via suspension polymerization, bulk polymerization or mass polymerization, and extrusion processes, wherein a water-retaining agent may or may not be blended into the polymer. If a water-retaining agent is blended into the polymer, then preferably the particles are prepared via bulk polymerization and extrusion processes.

"Particles" as used herein is to be understood to include beads, pellets, comminuted pieces, or nibs. In some embodiments of the invention, the polymer may or may not be blended with a water-retaining agent and bulk polymerized, and the polymer can be grinded into particles. In a further embodiment of the invention, a polymer melt may or may not be blended with a water-retaining agent. This melt can then be introduced into an extruder to produce a thread of polystyrene with a diameter ranging between 1 and 2 mm. These threads can be cut into pieces ranging from 2 to 3 mm to form conventional pellets.

Polymers suitable for use in the process of the invention are thermoplastic polymers. These polymers include, but are not limited to, polystyrene, styrene copolymers, e.g. styrenic/maleic anhydride copolymers, polyphenylene oxide, polystyrene-polyphenylene oxide blends, polyoxymethylene, poly(methyl methacrylate), methyl methacrylate copolymers, polyethylene, polypropylene, ethylene-propylene copolymers, polyvinyl chloride, polycarbonate, polyethylene terephthalate, crosslinked variations thereof, rubber-modified versions thereof, blends thereof, and interpenetrating networks thereof, e.g. polyethylene and polymerized vinyl aromatic resins, such as polystyrene. Preferably, the polymer is polystyrene.

The polymer particles may be solid polymers that are then used in an extrusion process to form articles, such as foamed board or oriented sheets. Some examples of polymer particles, e.g. solid polystyrene particles, and articles, e.g. extruded foamed boards, sheets, or panels are those well known in the art. Other examples of polymer particles and articles may include those taught in U.S. Pat. Nos. 6,166,099; 6,274,641; 6,420,444; 6,476,149; 6,433,092 and 6,608,141, the teachings of which are incorporated herein by reference.

Solid polymer particles for use in the invention may be produced via several well-known methods including suspension polymerization, bulk polymerization, mass polymerization, and extrusion processes.

The inventive concept involves manufacturing these well-known expandable polymer particles, solid polymer particles, and articles, e.g. sheets, panels, and boards from these expandable and solid polymer particles and then soaking these particles and articles in hot or cold water or applying steam to these particles and articles for a predetermined time so as to absorb a sufficient amount of water so that this water can then be used as a blowing agent for the expansion of these particles to a density that is lower than the density of the particles and articles prior to an expansion process.

One embodiment will be discussed with reference to expandable polystyrene (EPS) particles, however, as indicated in the preceding paragraph, other expandable polymer particles, e.g. expandable polyethylene (EPE), expandable polypropylene (EPP), or styrenic copolymers may be employed in carrying out the invention.

The polymer particles of the invention may be expandable and may contain a water-retaining agent that is incorporated into the polymer. As discussed herein above, this incorporation may occur via at least two different processes, that is, via an extrusion process that forms pellets or via bulk polymerization wherein the bulk material is then grinded into irregular sizes. Blending of the water-retaining agent with the polymer resin in an extrusion or bulk polymerization process allows control of the distribution of the water in the pellets, and the extrusion process also allows control over the shape, size, and size distribution of the pellets that are formed. This extrusion process is well known to those skilled in the art.

The size of the pellets will generally range from 1.5 to 2.0 mm in diameter and 2 to 3 mm in length. The size of the particles formed via bulk polymerization may in general be more difficult to ascertain, but for grinded samples, the particle size will range from about 2 to 3 mm. In general, the shape of the pellets is cylindrical and the shape of the particles formed by grinding the bulk, polymerized material is irregular. The water-retaining agent, if incorporated into the polymer particles, is selected from the group consisting of starches, zeolites, silica dioxide, and poly (N-isopropyl acrylamide). If a water-retaining agent is used, preferably, the water-retaining agent is poly (N-isopropyl acrylamide) (PNIPA).

If a water-retaining agent is used, the amount of water-retaining agent incorporated into the polymer particles will range from about 0.1% by weight to about 10.0% by weight, and preferably will range from about 1.0% by weight to about 5.0% by weight based on the weight of the polymer.

The amount of water contained in the particles before pre-expansion, and regardless of whether a water-retaining agent is added and regardless of whether the particles are already formed into articles, will range from about 0.1% to about 10% by weight based on the weight of the polymer particles. Preferably, the water content in the particles will range from about 1% to about 8% by weight. More preferably, the water content in the particles will range from about 3% to about 6% by weight based on the weight of the polymer.

One appropriate method for carrying out the invention is using an extruder, blending the water-retaining agent into the polymer melt, and operating the extruder at a temperature of about 160° C. in the die head. The extruder will produce an extrudate from the melt, which can then enter into a cooling medium or which can be cooled at room temperature, and the extrudate is cut into pellets.

Another appropriate method for carrying out the invention is to bulk polymerize the polymer that has been blended with a water retaining agent, form agglomerated material, and grind this material into particles that contain the water retaining agent.

These same two methods can also be used if a water-retaining agent is not blended into or incorporated into the polymer.

An appropriate method for impregnating or incorporating water into the polymer particles that may or may not contain a water retaining agent includes the step of immersing and soaking the polymer particles in boiling water, i.e. a temperature of about 100° C. for a time ranging from about less than one day, i.e. about a couple of hours to not longer than about 30 or 50 days in a water bath having a temperature of about 100° C.

Another appropriate method for incorporating or impregnating water into the polymer particles that may or may contain a water-retaining agent includes the step of treating the particles with steam at a temperature of about 100° C. for a time ranging from about less than one day, i.e. about a couple of hours to not longer than about 30 or 50 days.

A further appropriate method for impregnating or incorporating water into the polymer particles that may or may not contain a water retaining agent is to treat the particles with cold water for a time ranging from about less than one day, i.e. about a couple of hours to not longer than about 30 or 50 days.

These three above methods for impregnating or incorporating water into the polymer particles may also be used if the polymer particles are already formed into articles, e.g. sheets, panels, and boards. In this instance, the articles will be soaked in hot or cold water or will be subjected to steam so that the water is absorbed into these articles. These articles will then be subjected to an expansion process in a conventional manner.

As may be expected, the higher the temperature at which the soaking or the applying of steam occurs, the faster the polymer particles will absorb the water. It is envisioned by the inventors that the polymer particles or panels containing the polymer particles of the invention can be produced at the resin supplier's site. These resin particles or articles can then be shipped to the customer's site and the soaking or applying of steam can occur at the customer's site prior to expansion of the particles or articles.

It is also envisioned by the inventors that once the particles have absorbed the desired amount of water, the particles can be pre-expanded and/or molded. The amount of water that can be absorbed in the polymer will depend on the length of time the particles are soaked or steam is applied to the particles.

This amount of water will generally range from about 1.0% by weight to about 16.0% by weight, based on the weight of the polymer. Preferably, for effective expansion, the amount of water in the particles will range from about 2.0% by weight to about 5.0% by weight. In some instances, 15% by weight of water in the particles may still expand the material, however, this expansion may not be satisfactory for some end use applications.

Expansion of the particles and the articles formed from the particles in the pre-expansion step will generally occur via a heating medium, which may have a temperature ranging between 100 to 120° C. (212° F. to 248° F.) and a pressure ranging between 50 to 200 kPa. The heating medium will be applied to the particles and articles for about 5 to 120 seconds to pre-expand the particles and therefore the articles to a density ranging between about 193 kg/m$^3$ to about 8 kg/m$^3$ (i.e. about 12 pounds/cubic foot to about 0.5 pounds/cubic foot). The heating medium may be any conventional heating medium, e.g. steam, hot air, hot water, radiant heat, convection heat, micro-wave heat, high frequency radiation, or electromagnetic or any other well-know means for expanding polymers available to the industry pertaining particularly to expandable polystyrene (EPS).

This process for producing the particles of the invention differs from that taught in U.S. Pat. No. 6,342,540 B1 (BASF) in many respects. One difference is that in the invention the water-retaining agent is blended into the polymer resin in an extruder or via bulk polymerization and the water is incorporated into the resin after the particles are formed. According to the teachings of the '540 patent, an emulsifying agent, the polystyrene and the water are blended together in an extruder.

Another difference between the '540 patent and the invention is that in the invention a water retaining agent may or may not be added to the polymer, and the polymer particles and articles containing the polymer particles can be soaked in a hot or cold water bath or in steam for a predetermined time to absorb a desired amount of water for pre-expansion and expansion purposes.

With regard to the invention, additives may be added to the polymer during the process for producing the particles. For example, if appropriate, nucleating agents, e.g., talc or polyethylene waxes may be added. Additionally, it may be appropriate to add organic bromine compounds, such as the flame retardant hexabromocyclododecane, preferably together with flame-retardant synergists. In this instance, the amounts of these additives may range from about 0.5 to 5% by weight, since some decomposition of the bromine compounds can occur at the high temperatures of extrusion.

In the invention, if the particles are produced via an extrusion process, the extrusion temperature will range from about 120° C. to about 180° C., according to conventional practice.

As mentioned herein above, the water-retaining agent may be blended into a polymer melt during the extrusion process or bulk polymerization process at the polymer producer's site. This will allow the particles and articles made from the particles to be shipped to the converter's site where they can then be immersed and soaked in water or steam can be applied to the particles and articles for the water absorption step followed by pre-expansion and expansion for the articles and by pre-expansion and/or molding or extrusion processes with regard to the particles.

This same technique would also allow foamed articles, such as panels for use in insulation applications, to be formed in the following manner. The resin producer would produce the articles. If the articles were insulation panels, these panels would have the surface of conventional insulation panels. However, they would be thinner than conventional insulation panels, thereby making it more economical to ship these panels compared to conventional insulation panels. The builder or customer can soak the panels of the invention in water or treat them with steam to introduce the required amount of water for expansion purposes. These panels can then be expanded to form foamed insulation panels via various conventional expansion techniques discussed herein. For this purpose, two solid plates having the same dimensions as the foamed board may be used wherein the non-foamed, inventive panel would be placed between these two solid plates and water or steam would be applied to the non-foamed panel. This procedure would accurately control the dimensions and the density of the foamed insulation panel.

The invention is further illustrated, but is not limited by, the following examples, which pertain to expandable polystyrene particles.

EXAMPLES

Example 1

Polystyrene was prepared via bulk polymerization process. In three polystyrene samples, poly (N-isopropyl acrylamide) microgel (PNIPA) was incorporated as the water-retaining agent in weight percentages of 1%, 3% and 5%, and one polystyrene sample was prepared without a water-retaining agent (i.e. pure PS).

The graph of FIG. 1 illustrates the water absorption effects of the varying weight percentages of PNIPA microgel used as the water-retaining agent. The polymer was prepared in a bulk polymerization. Since these samples are large size samples, they have to be grinded in order to obtain particles of the desirable size. This was done by cooling the samples in liquid nitrogen, followed by grinding of these cold samples. This process results in a large size distribution and shape irregularities.

The particles were immersed in boiling water, i.e. between 100° C. to 120° C. and refluxed for some time. That is, the particles were immersed in boiling water for a few minutes to several days resulting in an agglomeration of particles. The samples were treated for hours or days, depending on the weight percentage of the PNIPA in the polystyrene and on the formulation of the polystyrene composition.

The water absorption was measured as a function of time. The amount of water that was absorbed depended on the number of days that the polystyrene was immersed in the water. As can be seen in FIG. 1, the greater the weight percent of PNIPA in the polystyrene, the higher the water content and the less number of days required to absorb this amount of water. In FIG. 1, the absorption of water in pure polystyrene is also given as a function of time.

Curve A represents pure polystyrene that does not contain a water-retaining agent (0% PNIPA). Curve B represents polystyrene containing 1% by weight of PNIPA as a water-retaining agent. Curve C represents polystyrene containing 3% by weight of PNIPA as water-retaining agent. Curve D represents polystyrene containing 5% by weight of PNIPA as a water-retaining agent.

As indicated by curve A, the water content or water absorption in the pure polystyrene is less than that in the polystyrene containing the PNIPA for the same amount of time. The rate of water absorption tends to increase with an increase in the amount of PNIPA. However, as shown in FIG. 1, after a long time, i.e. 40 to 50 days, curve A (0% PNIPA) may converge with curves B, C, and D to the same degree of absorption of water. This, of course, has not been proven experimentally.

Some of the samples were expanded using hot air. FIGS. 2A-2H are optical micrographs illustrating the foam morphology of these expanded polystyrene particles containing 3% and 5% by weight of PNIPA as a water-retaining agent. The water content in these particles is 3%, 6%, 8-10% and 12% by weight. As can be seen from these figures, when the water content is less than 6 or 8% by weight, the foam morphology is generally regular. However, when the water content is greater than 8% by weight, the foam morphology seems to significantly deteriorate. From this, it appears that the larger amount of water in the polystyrene particles tends to destroy the cell structure, which generally will lead to a collapse of the structure of the foam.

Example 2

Polystyrene particles were prepared via a mini-extruder. Polystyrene was mixed in the mini-extruder for five minutes at 160° C., which also was the temperature of the extruded material. A string of 1.5 to 2 mm in diameter was obtained. This string was cut into pieces of about 3 mm in length and the resulting granules were treated with boiling water at varying times. The weight percent of the water-retaining agent was 3.0% based on the weight of each sample, which was 5 grams. The types of PNIPA that were used included PNIPA microgel, PNIPA grafted on Aerosil 200, and linear PNIPA. Additional water retaining agents included high amylase starch (HAS) obtained from Cerestar, Belgium; Zeolit X (crystalline aluminosilicate, NA+ counterion, Si/Al<2.5, large pore size, channels with a diameter of 0.74 nm, particle size ranges from 20 to 40 μm.) provided by Cerestar, Belgium; and ordinary corn starch (Cerestar, Belgium). The samples also included pure polystyrene, i.e. not water retaining agent was incorporated into the polystyrene.

Figure 3:
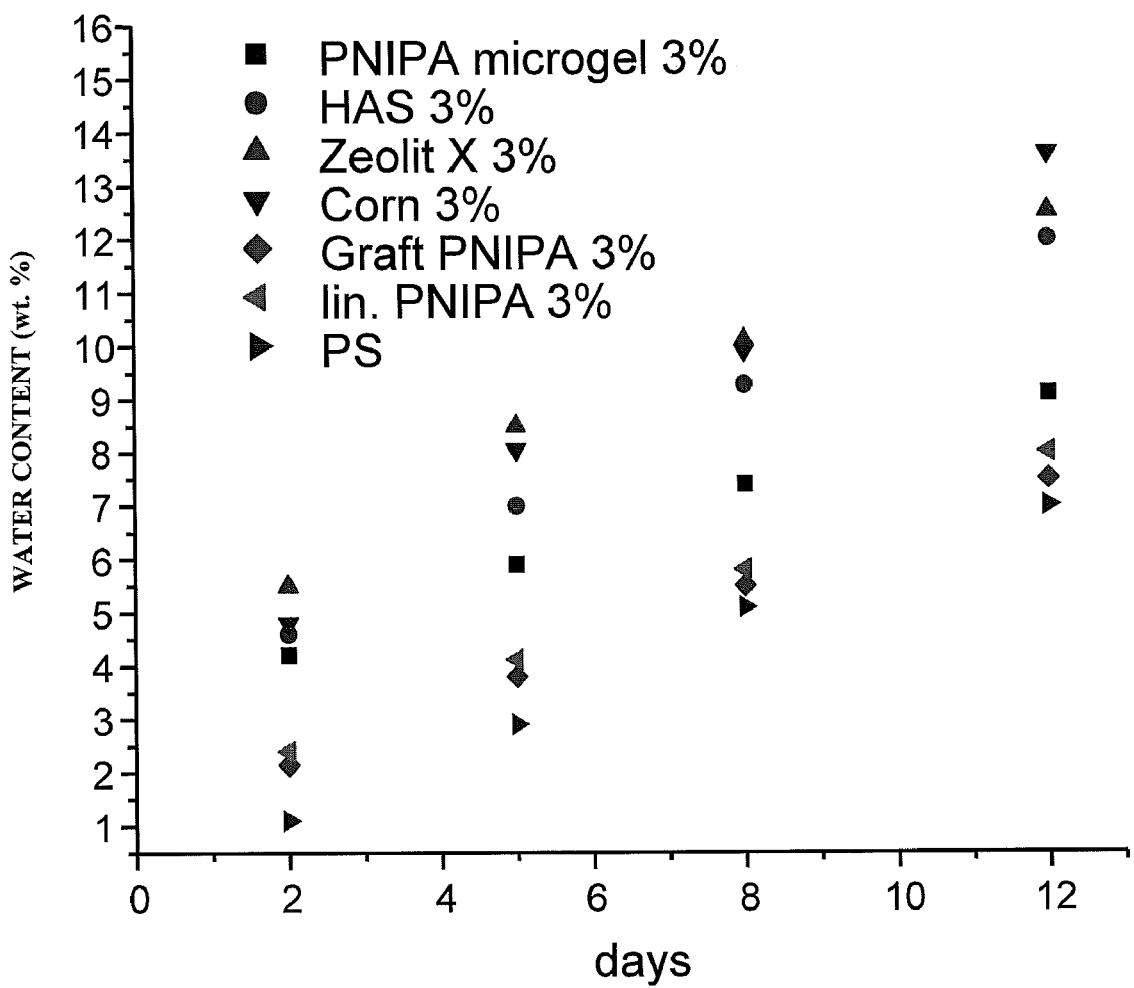
FIG. 3 is a graph showing the water content of extruded polystyrene samples containing different types of water retaining agents.

The absorption rate of water was measured via an analytical balance in a conventional manner. The water absorption of the samples is illustrated in FIG. 3, which shows that the polystyrene samples containing the water retaining agents have a greater water content compared to the polystyrene sample that does not contain a water retaining agent. However, FIG. 3 also shows that if pure polystyrene is soaked in water for a predetermined time, the polystyrene does absorb water.

Example 3

Figure 4:
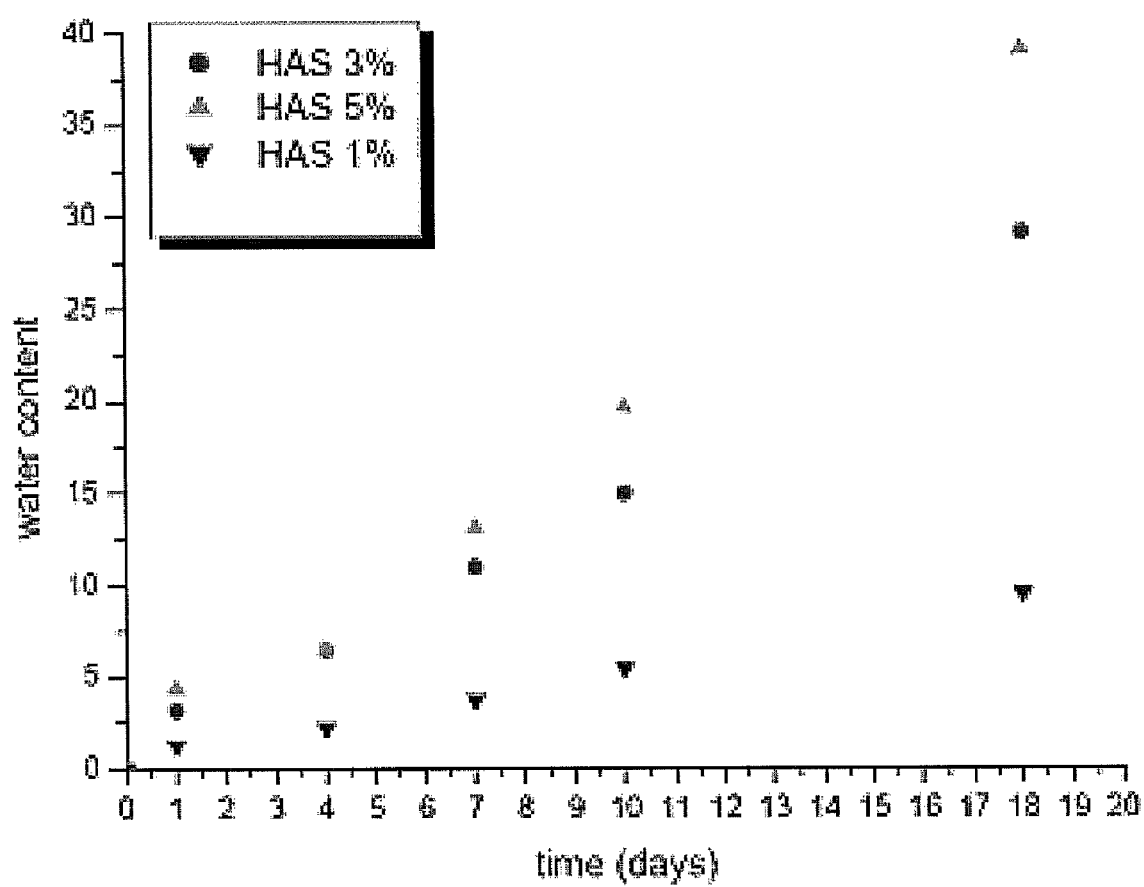
FIG. 4 is a graph showing the water content of polystyrene formed in a bulk polymerization process and containing 1%, 3%, and 5% by weight of high amylase starch based on the weight of the polymer.

This example pertains to the use of polystyrene with high amylase starch (HAS) as a water-retaining agent in weight percentages of 1%, 3%, and 5% for samples that weigh 5 grams. Samples were prepared and tested for water absorption content similar to that of Example 2. The results are shown in FIG. 4, which graph illustrates that an increase in the weight percent of HAS, i.e. 5% by weight, results in an increase in the absorption of the water.

While the present invention has been set forth in terms of specific embodiments thereof, it will be understood in view of the instant disclosure that numerous variations upon the invention are now enabled yet reside within the scope of the invention. Accordingly, the invention is to be broadly construed and limited only by the scope and spirit of the claims now appended hereto.

What is claimed is:

1. A process for preparing polymer particles that are expandable, the steps comprising:
   optionally blending a water retaining agent into the polymer melt, forming said polymer melt into particles; and
   after said particles are formed,
   incorporating water into said polymer particles, said water acting as a blowing agent for expanding said polymer particles;
   wherein said polymer particles contain poly(N-Isopropyl acrylamide) as a water retaining agent.

2. A process of claim 1, wherein said incorporation step includes the steps of immersing and then soaking said polymer particles in water at a temperature of about 100° C. for a predetermined time depending on the desired amount of water to be retained in said polymer particles.

3. A process of claim 2, wherein said amount of water retained in said polymer particles ranges from about 0.1% by weight to about 6% by weight based on the weight of the polymer.

4. A process of claim 1, wherein said incorporating step includes the step of treating said polymer particles with steam at a temperature of about 100° C. for a predetermined time depending on the desired amount of water to be retained in said particles that are expandable.

5. A process of claim 4, wherein said amount of water retained in said expandable polymer particles ranges from about 0.1% by weight to about 6% by weight based on the weight of the polymer.

6. A process of claim 1 further comprising the step of expanding said polymer particles by applying hot air to said particles.

7. A process of claim 1 further comprising the step of expanding said polymer particles by applying hot steam to said particles.

8. A process of claim 1 further comprising the step of expanding said polymer particles by applying a high frequency field to said particles.

9. A process of claim 1 wherein said weight percentage of said poly(N-lsopropyl acrylamide) in said polymer particles ranges between about 0.1% to about 10.0% by weight based on the weight of the polymer.

10. A process of claim 9 wherein said weight percentage of said poly(N-lsopropyl acrylamide) in said polymer particles ranges between about 1.0% to about 5.0% by weight based on the weight of the polymer.

* * * * *